United States Patent [19]

Stallbohm

[11] Patent Number: 5,677,666
[45] Date of Patent: Oct. 14, 1997

[54] METHOD OF MONITORING A VEHICLE INTERIOR

[75] Inventor: Uwe Stallbohm, Wuppertal, Germany

[73] Assignee: Kiekert AG, Heiligenhaus, Germany

[21] Appl. No.: 682,979

[22] Filed: Jul. 16, 1996

[30] Foreign Application Priority Data

Sep. 8, 1995 [DE] Germany .................. 195 33 192.3

[51] Int. Cl.$^6$ ........................................... G08B 13/16
[52] U.S. Cl. ........................ 340/426; 340/544; 367/93
[58] Field of Search ............................ 340/426, 544,
340/552, 553, 554; 367/93, 94

[56] References Cited

U.S. PATENT DOCUMENTS

| 4,382,291 | 5/1983 | Nakauchi | 340/552 |
| 5,424,711 | 6/1995 | Müller et al. | 340/426 |
| 5,598,141 | 1/1997 | Grasmann et al. | 340/426 |

FOREIGN PATENT DOCUMENTS 90 03 065   12/1990   Germany .

Primary Examiner—Glen Swann
Attorney, Agent, or Firm—Herbert Dubno

[57] ABSTRACT

The interior of an automotive vehicle is monitored for incursion by launching primary sound wave pulses into the interior of the vehicle and picking up the primary sound wave pulse together with superimposed reflection and sound signals generated by incursion, etc. The picked-up sound waves are transformed into electrical signals which are decomposed in an A/D converter into a time sequence of digital measurement vector elements which in turn are compared with reference elements by a subtraction process to produce a different vector. Summation of the positive terms of the difference vector and summation of the negative terms of the difference vector to produce positive and negative sums allow the sums to be combined to form a gradient which is added to previous gradients to provide a gradient sum. The alarm is triggered when the gradient sum exceeds a threshold.

5 Claims, 1 Drawing Sheet

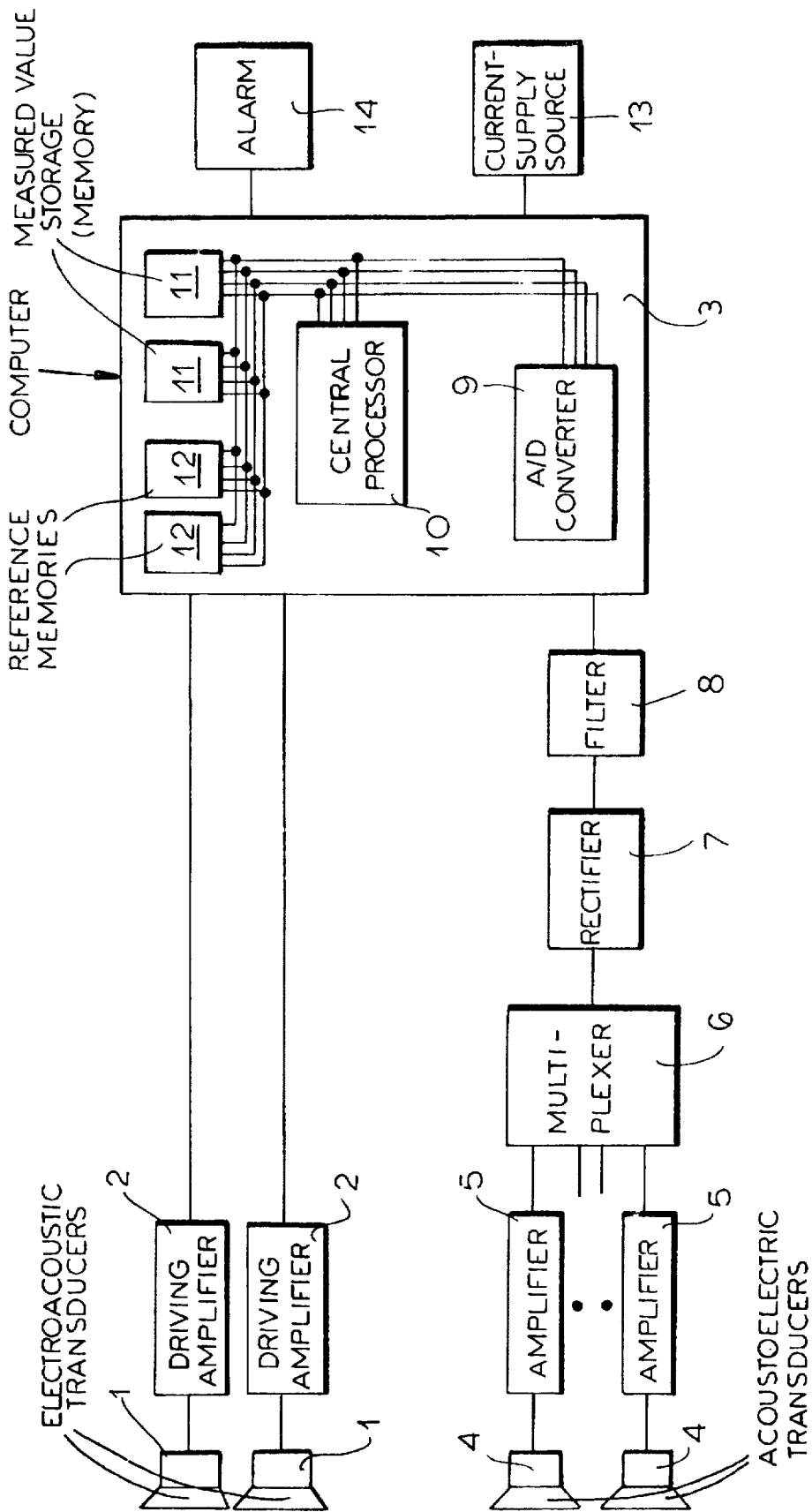

METHOD OF MONITORING A VEHICLE INTERIOR

FIELD OF THE INVENTION

My present invention relates to a method of monitoring the interior of an automotive vehicle, usually against an incursion, and, more particularly, to a method of operating an alarm system of the type in which electroacoustic transducers launch primary sound wave pulses into the interior of a vehicle and acoustoelectric transducers pick up reflected and other sound waves superimposed on the primary sound wave pulse for evaluation and generation of an alarm in the case of an incursion. The term "incursion" is used here not only to signal the presence in the vehicle of an unauthorized person but also to indicate a condition which is unusual, for example, the breakage of a vehicle window, the opening of a door, or the creation of other damage which might itself contribute to the sound superimposed upon the primary sound wave pulse or upon the reflected sound waves, or which will result in a change in the nature of reflected or transmitted sound waves in the vehicle.

BACKGROUND OF THE INVENTION

It is known, for example from earlier work on behalf of the present assignee, to provide an alarm system for an automotive vehicle which has a computer-controlled sound transmitter for repetitively emitting in the interior of a vehicle, primary sound wave pulses, a sound receiver for picking up reflected sound waves and other sound waves in the vehicle interior which may be superimposed on one another and on the primary wave pulse and for converting the picked up sound wave into electrical measurement signals, an amplifier for amplifying the electrical signals from the receiver and an analog/digital converter (A/D converter), connected between the amplifier and the computer unit for transforming at a scanning rate a, the measurement signals into digital measurement vectors V. With such a system, each electrical measurement signal can be transformed in the A/D converter into a time sequence of x digital measurement victor elements $n_1 \ldots n_x$ whereby the sequence of measured vector elements $n_1 \ldots n_x$ are stored in a measurement value memory of the computer unit with p storage locations or memory addresses and whereby the alarm is operated by the computer unit when, after a comparison of the measured vector elements $n_1 \ldots n_x$ with reference vector elements $n_1' \ldots n_x'$ stored in the computer unit, shows a change in the measurement vector from that which is expected, representing some incursion as that has been defined above.

As sound receivers acoustoelectric elements are used which transform the sound waves in the audible range or in the ultrasonic range or both into electrical oscillations. The sound waves can be those which are transmissible through any gaseous medium, here usually air, as well as so-called body waves which are transmitted through solid structures of the vehicle. The electrical oscillations form the measured signal which must be further processed generally with the aid of an amplifier which customarily is of the analog type.

The alarm unit of the vehicle can output an acoustic and/or optical signal and can be, for example, the usual horn of the vehicle or a separately provided siren or electroacoustic transducer. In the case of optical output for the alarm, the alarm can activate the light system of the vehicle to repeatedly switch on and off the headlights or the interior lights or any combination of exterior and interior vehicle lights. A separate light can be provided on the vehicle for activation by the alarm. The alarm can also emit radio waves or other wireless signals to an appropriate receiver remote from the vehicle to signal an incursion to a remote location.

The A/D converter is an electronic circuit which chops an analog measurement signal into a time sequence of digital values utilizing an integration approach or a method of successive approximations. The latter methods allow short converter cycling times and, as a consequence, higher scanning rates. The scanning rate a is defined as the number of successive analog/digital conversion events per unit time.

With the aforedescribed process, an incursion into the interior of the vehicle will trigger an alarm. The incursion can, as has been noted, be a breakage of a vehicle window, the intrusion into the interior space of a mechanical element, the unauthorized operation and/or locking or release element of a vehicle door lock or a lock of another compartment of the vehicle, or the entry into the interior space of an unauthorized person whether by reaching into the interior space or the actual presence of the unauthorized person in this space.

The process, therefore, serves for the active monitoring of the interior space and depends upon the emission into the latter of primary sound wave pulses of a duration, signal shape and intensity which can give rise to reflected and otherwise superimposed sound waves which form a sonic picture of the vehicle interior such that a change in this sonic image, either statically or dynamically, signal an unauthorized incursion. The reference vector which is stored by the computer and compared with the measured vector is thus the equivalent of a sonar image which corresponds to the vehicle interior without incursion. When the measured vector differs significantly from the reference vector, a change in the sonar image is detected which can result in the generation of the alarm. Repeated emission of the primary sound wave pulses, usually periodically in predetermined time intervals, will enable discovery of a trespass on the vehicle substantially immediately upon its occurrence.

A process of the aforedescribed type is found, for example, in German Utility Model DE 90 03 056.6 U1. In this system, the evaluation of the measured vector is effected by determining amplitude, time and frequency and comparison of these values with stored thresholds defining a reference vector. Should the associated threshold be exceeded or understepped, the alarm is activated.

While the earlier method has been found to be satisfactory for many purposes, it has not been found to be sufficiently reliable, i.e. free from false alarms since there are many circumstances under which alarms were triggered in which no incursion occurred. For example, the measurement signal was found to be affected by certain types of temperature fluctuations and air movements. For example, the temperature fluctuations may have changed interior dimensions of the vehicle by expansion or contraction.

Damping of the amplitude characteristic could also result, i.e. the maxima and minima of the envelope curve of the measured signal could be decreased or increased respectively.

In order to reduce false alarms with high temperature fluctuation, the system could only be triggered with a relatively large deviation between the reference vector and the measured vector. This, of course, means that the sensitivity of the system to an actual incursion had to be reduced and thus the alarm was less reliable in detecting an incursion than was desirable.

OBJECTS OF THE INVENTION

It is the principal object of the present invention to provide an improved process for monitoring the interior of a motor vehicle which is capable of triggering the alarm with even minimal incursion into the vehicle with high reliability, but nevertheless has important protection against false alarm.

More particularly, it is an object of the invention to provide a method of operating an alarm system to protect against incursions into the interior of a vehicle whereby drawbacks of earlier systems are avoided.

Still another object of the invention is to provide a method of operating an alarm system capable of improved sensitivity with respect to trespasses upon a vehicle interior without thereby increasing the tendency of the system to generate false alarms.

SUMMARY OF THE INVENTION

These objects and others which will become apparent hereinafter are attained, in accordance with the invention, in a method of operating an alarm system for monitoring the interior of a motor vehicle which comprises a computer unit for operating a sound emitter for repeated irradiation of the interior with primary sound wave pulses, a sound receiver connected to the computer unit for converting measured sound wave signals into electric signals, an amplifier connected to the sound receiver and an A/D converter connected between the amplifier and the computer unit, whereby the measured vector picked up by the receiver and converted into the measured signal is a composite of the transmitted primary sound wave, internally reflected sound waves superimposed thereon and any other sound waves generated in or transmitted within the vehicle body. In the A/D converter, each electrical measurement signal is converted into a time sequence of x digital measurement vector elements $n_1 \ldots n_x$ and the sequence of measurement vector elements $n_1 \ldots n_x$ is stored in a measured value memory of the computer unit with p stored locations or addresses, the measured vector element $n_1$ being generated at a point in time in which the respective measurement signal exceeds a predetermined rest signal amplitude and the measured vector element $n_x$ is formed at a point in time in which the respective measured signal again falls below the rest signal amplitude. The measurement vector V is compared in the computer unit with a previously measured reference vector stored in a reference memory R with p storage locations, the reference vector having reference vector elements $n'_1 \ldots n'_x$. For the comparison, the measurement vector elements $n_1 \ldots n_x$ and the reference vector elements $n'_1 \ldots n'_x$ are subjected to subtraction to form a difference vector D with difference vector elements $d_1 \ldots d_x$.

All of the positive difference vector elements are added to a positive sum $S_+$ and all of the negative vector elements are added to a negative sum $S_{31}$ and the positive sum $S_+$ and the negative sum $S_{31}$ are added to form a gradient with each gradient being added to a preceding gradient so that a gradient sum is formed by the combination of the gradients G from the subsequent measurement signal. In that case, the alarm is activated by the computer unit when the gradient sum exceeds a predetermined alarm threshold.

It will be understood that the number x of measurement vector elements is always smaller than the number p of storage locations of the measured value memory. The scanning rate a can be correspondingly dimensioned without difficulty. The rest signal amplitude is a signal strength threshold which lies significantly above the natural noise which is cumulative form the sound receiver and the amplifier.

In other words a measurement vector is produced which can be broken into a number x of measurement vector elements utilizing a constant scanning rate a such that the measurement vector elements derive from the measurement signal between exceeding the rest signal amplitude and a point at which the measured signal falls below that amplitude which lies above the noise and the cumulative difference between the thus selected measurement vector elements and the corresponding reference vector elements is used to activate the alarm. The gradient sum is the time integral over a number of such gradients. Since x is a function of temperature, the number of measurement vector elements can differ from the number of reference vector elements.

In the formation of the difference vector, however, the rule is used:

$$d_1 = n_1 - n'_1, d_2 = n_2 - n'_2, \ldots \text{etc.}$$

up to the stored vector element with the highest x. Of course the difference formation can be inverted, i.e. the reference vector element can be subtracted from the measured value vector element.

In a commonly-owned German patent application 195 24 782.5 and related U.S. patent application Ser. No. 08/503, 150 filed 17 Jul. 1995 (Attorney's docket No. 19671), a process for monitoring the interior of an automotive vehicle is described in which a comparison between a measurement vector and a reference vector is carried out by means of a DTW algorithm. The DTW algorithm effects a nonlinear time compensation and amplitude compensation to compensate for the temperature effects upon the measurement signal. This approach has been found to be highly advantageous although it is somewhat expensive since, with the DTW algorithm, because of the nonlinear optimization problems, the number of calculation operations increases exponentially with the number of measurement vector elements or of reference vector elements. The calculating system thus must be capable of handling such power and is expensive and the energy costs can be prohibitively high. With the invention a time compensation can be completely avoided as long as the temperature fluctuations are not extreme and the aforementioned calculations are used. For this it is important that the computer be able to define the beginning and end of each measurement signal based upon the predetermined rest signal amplitude and hence the first and last measurement vector elements automatically, thereby normalizing the first of the measuring elements and hence the commencing of the measuring signal with the first reference vector element.

Apart from this normalization of the start of the measurement vector or signal only an amplitude or signal level comparison between the measured vector element and the sample or reference vector element is required without further concern of variations of the time course of either signal, utilizing simple subtraction of one vector element from the other is required. The alarm threshold of the gradient sum can be chosen without difficulty since practically no temperature variation dependency of false alarms can continue to apply while even the smallest incursion into the interior of the vehicle will trigger an alarm. Subsequent gradients which ideally are zero change the gradient sum as a function of temperature change relatively slowly and by relatively small amounts while even the smallest incursion into the vehicle interior can lead to a significant jump in the gradient sum.

Jumps in the gradient sum mean that the gradient sum within a short time period $t_A$ can be counted from an initialization of the apparatus or from a subsequently described increase in the alarm threshold. Consequently, a differentiation between a temperature effect and an incursion is readily made. The computation costs are comparatively small since the number of calculations increases only linearly with the number of measurement vector elements.

Extreme temperature fluctuations and extreme changes in the time course of a measurement signal connected therewith can be detected by a discrete linear time-compensation operation carried out in large steps. In this case, the scanning rate a is reduced under the control of the computer unit when the number x of the measurement vector elements exceed the number p of storage locations of the measured value memory or storage.

Conversely, the scanning rate a is increased when the number x of the measurement vector element falls below the number p/2, where p is the number of storage locations in the memory of the measured value. As a result, it can be ensured that a complete measurement signal is transformed in a measurement vector and stored and further that each complete measurement vector is compared with the corresponding reference vector. In practice it has been found that an increase or reduction of the scanning rate a by about 10% is completely sufficient to cover an operating temperature range from −40° C. to 85° C.

In a preferred embodiment, a measurement vector V from a previous measurement is stored in the reference memory as a new reference vector V when the magnitude of the gradient exceeds a predetermined drift threshold. The drift threshold of the gradient can be significantly below an alarm value. With this embodiment it can be ensured that in the case of a long maintained monotonic temperature change the gradient sum cannot arrive in the range of the alarm threshold solely as a consequence of temperature effects. It is also possible in accordance with the invention to require a significant increase in the gradient sum within a time interval greater than $t_A$ to the alarm threshold before the triggering of the alarm when there is a danger of monotonic or slow increase in the gradient sum.

The process of the invention is especially reliable and utilizes relatively simple equipment, especially when the measurement signal before conversion into a digital measurement vector V is subjected to rectification in a rectifier, whereupon a filter is provided so that the measurement signal is recovered as an envelope of the original measured signal.

In a preferred embodiment of the invention the reflected and superimposed sound waves from the vehicle interior are picked up by stepped-apart and separate sound receivers, converted into a plurality of measurement signals and fed to the computer unit via a multiplexer. The measurement signals are then stored in measured value memories associated with the receivers with each measured value memory being associated with a reference memory having the reference vector elements stored therein.

More specifically the method of the invention is used for monitoring an interior of an automotive vehicle for incursion utilizing an alarm system having at least one sound emitter controlled by a computer unit for repetitive launching of primary sound wave pulses into the interior of the motor vehicle, a sound receiver for picking up sound waves in the vehicle interior including the primary sound wave pulses and reflected other waves superimposed thereon and for converting received sound waves into corresponding electrical signals, an amplifier connected to the sound receiver for amplifying the electrical signals, and an analog/digital converter connected between the amplifier and the computer unit for converting the electrical signals with a scanning rate a into digital measurement vectors.

The method can comprise the steps of:

(a) decomposing each of the electrical signals in the analog/digital converter into a time sequence of x digital measurement vector elements $n_1 \ldots n_x$ representing a measurement vector V for each of a succession of measurement signals, with the measurement vector element $n_1$ being formed when the respective electrical signal rises above a predetermined rest signal level and the measurement vector element $n_x$ being formed when the respective electrical signal falls below the predetermined rest signal level;

(b) storing the sequence of x digital measurement vector elements $n_1 \ldots n_x$ in a memory of the computer unit having p storage locations;

(c) comparing each measurement vector V stored in the memory with a previously stored reference vector R with respective reference vector elements $n'_{-1} \ldots n'_{-x}$ and forming a difference vector D with difference vector elements $d_1 \ldots d_x$ by subtraction of the elements $n_1 \ldots n_x$ and $n'_{-1} \ldots n'_{-x}$;

(d) adding all positive ones of the difference vector elements to form a positive sum $S_+$ and all negative ones of the difference vector elements to form a negative sum $S_-$;

(e) combining the positive sum and the negative sum additively to form a gradient of value G and adding values of the gradient together with gradient values of subsequent measurement signals, thereby forming a gradient sum; and (f) activating the alarm upon the gradient sum exceeding a predetermined alarm threshold.

BRIEF DESCRIPTION OF THE DRAWING

The above and other objects, features, and advantages will become more readily apparent from the following description, reference being made to the sole FIGURE of which is a block diagram showing the apparatus for carrying out the method of this invention.

SPECIFIC DESCRIPTION

In the drawing I have shown a plurality of sound transmitters or emitters in the form of electroacoustic transducers 1 for emitting primary sound wave pulses into the interior of an automotive vehicle. The emitters 1 are connected by drivers 2 to a computer unit 3. The system also includes a plurality of sound receivers, i.e. acoustoelectric transducers 4 which receive the primary sound wave pulses on which are superimposed reflected and other sound waves, e.g. sound waves generated by incursion into the vehicle and which convert the received sound waves into electrical measurement signals.

The electrical measurement signals are themselves amplified by respective amplifiers 5 which can be connected to a multiplexer 6 which transmits each amplified signal in turn to a rectifier 7 and a filter 8. The output of the filter 8 is connected to an analog/digital converter 9 of the computer unit 3. The analog/digital converter 9 is connected by a data and control bus to the central processor 10 and is controlled in turn by the latter so as to have a scanning rate a. With the aid of the analog/digital converter, the envelope of the measurement signal formed by the rectifier 7 and filter 8, is transformed into a digital measurement vector V for each of the receivers. In the computer unit for each receiver 3 a respective measurement value memory 11 and a reference memory 12 is provided, the reference memories 12 having respective reference vector elements R stored therein.

The entire device as thus described for monitoring the interior of the vehicle is connected to a current supply unit 3, for example, the vehicle battery. The battery unit 3, in turn, can activate an alarm 14 which is repetitive of a siren, horn or other acoustic device for generating an audible alarm and/or a visual alarm in the form of flashing lights or the like. The alarm unit 14 is repetitive of any signalling system which may be used for that purpose including a signalling system communicating by wireless to a receiver.

After initialization or start-up of the monitoring system, a first primary sound wave pulse is launched by means of one of the sound emitters 1 into the interior of the vehicle and the receivers 4 pick up this sound wave pulse on which reflections and the like are superimposed, the respective electrical signals from the amplifiers 5 are fed by the multiplexer 6 through the rectifier 7 and the filter 8 so that envelope curve measurement signals are fed to the analog/digital converter.

In the analog/digital converter 9, each envelope curve is transformed with the scanning rate a into a digital measurement vector V. Each electrical measurement signal is thus subdivided into the analog/digital converter 9 into a sequence of x digital measurement vector elements $n_1 \ldots n_x$. In the initialization of the unit without incursion, the sequence of measurement vector elements $n_1 \ldots n_x$ are stored in the respective reference memories 12 of the computer unit 3 as reference vectors R. For this purpose, each reference memory 12 has p storage locations. These vector elements become the vector elements referred to earlier as the elements $n'_1 \ldots n'_x$.

In operation, the emitters 2 launch sound wave pulses into the interior of the vehicle at time-spaced intervals. When the measurement signal at the filter 8 exceeds a rest signal level, a respective measurement vector element $n_1$ is formed and is followed by vector elements $n_2 \ldots$ with the measurement vector element $n_x$ being formed at a point in time that the measurement signal again falls below the predetermined rest signal level.

The process is repeated until each of the measurement signal memories 11 has stored a respective set of measurement vector elements $n_1 \ldots n_x$. The respective measurement value memories 11 also have each p storage locations. The successive measurement vectors V are then compared with the reference R by subtracting the reference vector elements $n'_1 \ldots n'_x$ or vice versa to form the difference vector elements $d_1 \ldots d_x$ defining a difference vector.

All of the positive difference vector elements are added in the computer unit 3 to a positive sum $S_+$ while all of the negative difference vector elements are added to form the negative sum $S_-$. Addition of the positive sum $S_+$ and the negative sum $S_-$ generates a gradient G. When each gradient G is determined, it is added to all previously formed gradients G to produce a gradient sum in the computer 3. When the gradient sum G exceeds a predetermined alarm threshold, the computer 3 operates the alarm unit 14. A gradient sum can be formed in this manner for each of the receivers 4 and, of course, the alarm 14 can be activated when any gradient sum exceeds the respective threshold.

The scanning rate a of the analog/digital converter is reduced by about 10% when the number x of measurement vector elements exceeds the number p of storage locations and is increased by about 10% when the number x of measurement vector elements falls below a number p/2 of storage locations of the individual memories 11.

When a gradient G exceeds a predetermined drift, the threshold corresponding measurement vector V at that point in time is stored in the reference memory 12 as the new reference vector.

When the sound waves launched into the interior of the vehicle are in an ultrasonic range of about 40 kHz, perturbations by speech or the like can be entirely excluded.

I claim:

1. A method of monitoring an interior of an automotive vehicle for incursion utilizing an alarm system having at least one sound emitter controlled by a computer unit for repetitive launching of primary sound wave pulses into the interior of the motor vehicle, a sound receiver for picking up sound waves in the vehicle interior including the primary sound wave pulses and reflected other waves superimposed thereon and for converting received sound waves into corresponding electrical signals, an amplifier connected to said sound receiver for amplifying said electrical signals, and an analog/digital converter connected between said amplifier and said computer unit for converting said electrical signals with a scanning rate a into digital measurement vectors, said method comprising the steps of:

(a) decomposing each of said electrical signals in said analog/digital converter into a time sequence of x digital measurement vector elements $n_1 \ldots n_x$ representing a measurement vector V for each of a succession of measurement signals, with the measurement vector element $n_1$ being formed when the respective electrical signal rises above a predetermined rest signal level and the measurement vector element $n_x$ being formed when the respective electrical signal falls below said predetermined rest signal level;

(b) storing the sequence of x digital measurement vector elements $n_1 \ldots n_x$ in a memory of said computer unit having p storage locations;

(c) comparing each measurement vector V stored in said memory with a previously stored reference vector R with respective reference vector elements $n'_{-1} \ldots n'_{-x}$ and forming a difference vector D with difference vector elements $d_1 \ldots d_x$ by subtraction of the elements $n_1 \ldots n_x$ and $n'_{-1} \ldots n'_{-x}$;

(d) adding all positive ones of said difference vector elements to form a positive sum $S_+$ and all negative ones of said difference vector elements to form a negative sum $S_-$;

(e) combining said positive sum and said negative sum additively to form a gradient of value G and adding values of the gradient together with gradient values of subsequent measurement signals, thereby forming a gradient sum; and (f) activating said alarm upon said gradient sum exceeding a predetermined alarm threshold.

2. The method defined in claim 1 wherein said scanning rate a is reduced when the number x of the measurement vector elements exceeds the number p of storage locations of the measured value memory, and the scanning rate a is increased when the number x falls below p/2.

3. The method defined in claim 1 wherein a measurement vector V is stored in a reference memory of said computer unit as a new reference vector R when a gradient value GT exceeds a predetermined drift threshold.

4. The method defined in claim 1 wherein a measurement signal, prior to conversion into a digital measurement vector, is transformed in a rectifier into an envelope-curve measurement signal.

5. The method defined in claim 1 wherein measurement signals are obtained from a plurality of sound receivers at different locations in said vehicle, further comprising the steps of multiplexing the measurement signals from said receivers to said computer unit, thereby forming trains of measurement vector elements and feeding each train representing a measurement signal vector to a respective measurement signal memory associated with a respective reference vector memory.

* * * * *